Figure 1:
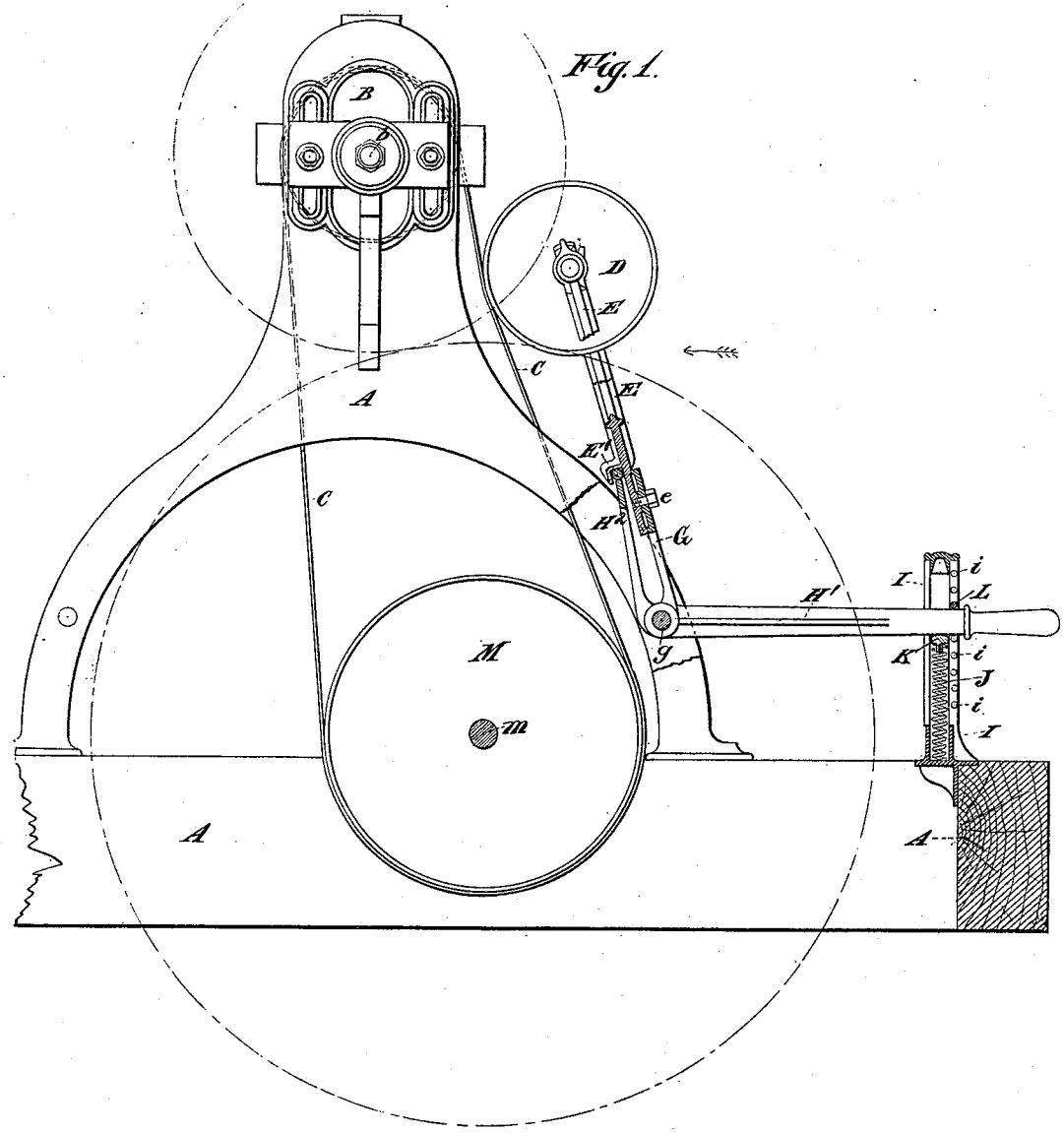

(No Model.)

G. H. ZSCHECH.
BELT TIGHTENER.

No. 269,369. Patented Dec. 19, 1882.

2 Sheets—Sheet 1.

WITNESSES
Charles R. Searle,
Charles C. Stetson

INVENTOR
Gustavus H. Zschech
by his attorney (No Model.)
G. H. ZSCHECH.
BELT TIGHTENER.
No. 269,369.  Patented Dec. 19, 1882.
2 Sheets—Sheet 2.
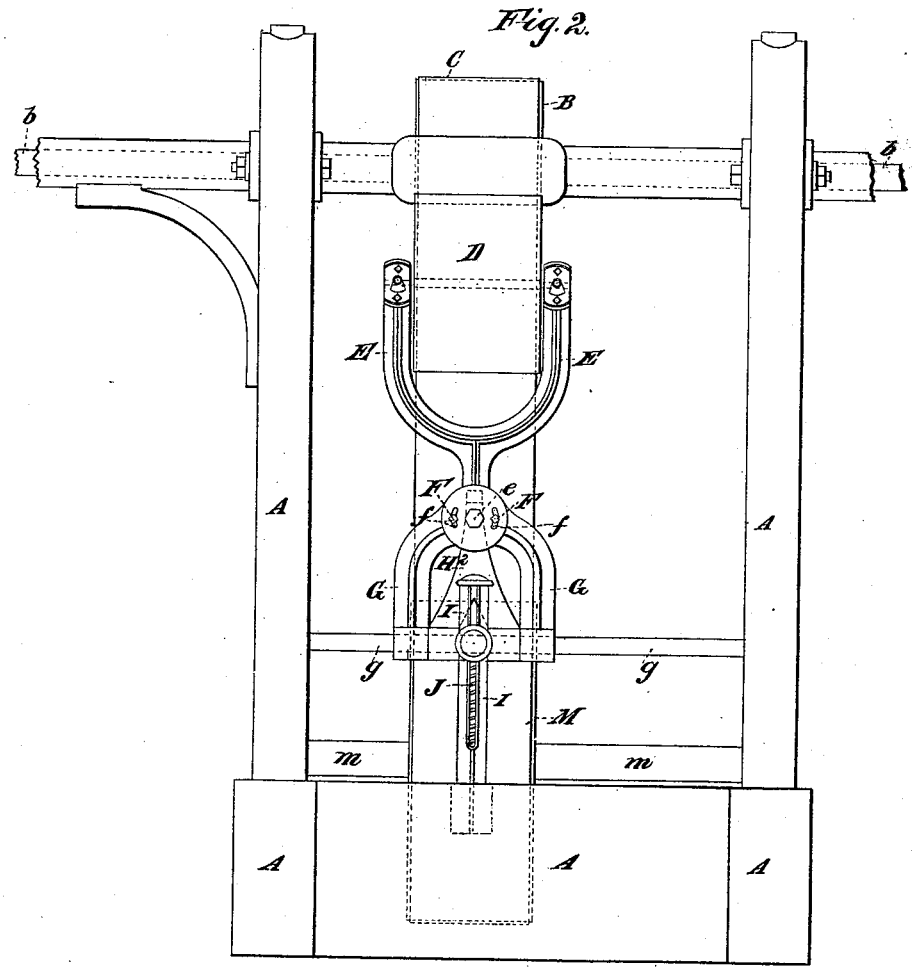

UNITED STATES PATENT OFFICE.

GUSTAVUS H. ZSCHECH, OF INDIANAPOLIS, INDIANA.

BELT-TIGHTENER.

SPECIFICATION forming part of Letters Patent No. 269,369, dated December 19, 1882.

Application filed December 19, 1881. (No model.)

*To all whom it may concern:*

Be it known that I, GUSTAVUS H. ZSCHECH, of Indianapolis, Marion county, in the State of Indiana, have invented certain new and useful Improvements Relating to Tighteners for Belts, of which the following is a specification.

I will describe the invention as applied to the driving-belt running upon a pulley of small diameter, driving the upper pair of circular saws.

One object of the invention is to facilitate the guidance of the belt. Another object is to tighten the belt in proportion to the resistance which is experienced by the saw, so that there shall be sufficient tightness at the periods when great resistance is experienced without the friction upon the bearings which would obtain if the same tension were maintained uniformly.

The difficulty of producing circular saws of sufficient diameter to cut through the largest logs has induced the arrangement of a pair of such saws, one with the shaft below and the other with the shaft above the lumber to be cut. Such saws are nicely adjusted to cut in the same plane, with cuts meeting each other. In sawing by such means logs differing greatly in size the upper saw will be subjected to great variations of resistance. In the large end of the largest log it will have nearly or quite as much work to do as the lower saw; but at many periods it will have little or nothing to do. My tightener may be applied to the belt for the upper saw.

The accompanying drawings form a part of this specification, and represent what I consider the best means of carrying out the invention.

Figure 1 is a side elevation, partly in section. Fig. 2 is an end view, looking in the direction of the arrow in Fig. 1.

Similar letters of reference indicate like parts in all the figures.

A is the fixed frame-work.

B is an ordinary stout pulley, of ample width but of small diameter, mounted upon the arbor $b$, supported in suitable fixed bearings. (Not shown.)

C is the ordinary driving-belt therefor, running from the pulley M on the lower saw-arbor, $m$.

The tightener-pulley D is mounted in a forked frame, E, which is pivoted at the point $e$ on a bifurcated lower frame, G. The surface of each part adjacent to the pivot $e$ is extended to make a broad circular bearing of the parts D and G against each other, and fastening-bolts F are inserted through curved slots $f$. By slackening these bolts F the joint $e$ is made loose, so that the part E may be turned to any required extent relatively to the part G. The tightening of the bolts F stiffens the joint $e$ and makes the parts E and G serve as a single rigid frame, vibrating on the axis $g$. The frame-piece E is formed with a stout socket E', in which is received the rounded end of the upright arm $H^2$ of the bell-crank lever H' $H^2$. This lever turns on the same center $g$. Its horizontal arm H' is received in a long upright slot in a casing, I, which incloses a long spiral spring, J, having a tendency to expand itself, which is communicated through the sliding piece K to the arm of the lever H' $H^2$.

L is a pin extending across the slot in the upright casing I. It may be adjusted in position by inserting it in any one of the series of holes $i$ represented.

In the use of my tightener the spring J exerts a nearly constant force, tending to lift the arm H' and consequently to press the tightener-pulley D against the belt C. The action of the pulley is against the slack portion of the belt, by which I mean that portion on which there is a less tensile strain than the other parts, depending on the amount of resistance encountered by the saw. The arrangement also brings the tightener-pulley D into close proximity with the driven pulley B. During the long periods while the upper saw is running light the tension on all parts of its belt C is practically uniform, and the tightener-pulley D is forced back by the tension of the belt C, and the spring J is compressed; but when a large log is introduced and the saw on arbor $b$ encounters great resistance the tension on the parts of the belt C becomes very unequal. The tight side of the belt, which is indicated by the arrow pointing downward, is subjected to great strain, and the loose side, which is indicated by the arrow pointing upward, is greatly relieved from strain. Under these conditions the spring J expands itself, lifting the arm H' H², and, turning the framing E G in its center, $g$, presses the tightener-pulley D forward against the belt. This maintains a proper tension on the slack side of the belt and performs the ordinary functions of a tightener. It also, by virtue of the close proximity of the tightener-pulley D to the saw-pulley B, causes the belt C to hug around a larger portion of the periphery of the latter, thus increasing its efficiency. In all positions of the parts the turning of the framing E slightly on its center $e$ enables the tightener-pulley D to deflect the belt C to one side or the other. It is thus an efficient guiding means. If the belt indicates a disposition to run toward either end of the saw-pulley B, I slacken the bolts F and turn the forked frame E slightly on the center $e$ in the proper direction to incline the guiding-pulley D and correct the tendency. When the right position is obtained the bolts F are tightened and the whole is ready to work smoothly and correctly for an indefinite period.

The pin L may be shifted up and down in the several holes $i$, as required. It fixes a definite limit to the forward travel of the tightener-pulley.

I attach much importance to the arrangement of the parts. The pulley D must not be pressed against the belt C at a point midway or nearly so between the pulleys B and M. It must be adjusted so as to make its forward and backward travel as near as practicable to one of the pulleys. This arrangement insures that the belt shall be forced into much more extended contact with the pulley when the strain is greatest, and also allows a given amount of forward and backward motion to produce a greater effect upon the tightening and relaxing of the belt. When the resistance of the saw is lessened the tension of the belt is more efficient in urging back the tightener-belt by reason of this arrangement of the parts, whereby the tightener-pulley D traverses close to the saw-pulley B.

Modifications may be made in the several details without departing from the principle or sacrificing all the advantages of the invention. The distance of the pulley D from the pulley B may be varied within narrow limits, so long as sufficient space is allowed for the thickness of the belt between the peripheries at the closest point. I propose to change the position of the center $g$ when the arbor $b$ of the upper saw is raised by the introduction of a new or large saw, and is successively lowered as the diameter of the saw is reduced by repeated sharpenings.

I claim as my invention—

1. The belt-tightener described, having the swiveling joint $e$ between the parts E and G, in combination with confining means F, as herein described.

2. The tightener-pulley D, supported in a framing turning on the center $g$, which is operated by the lever H', in combination with the slotted standard or casing I, spring J, and adjustable pin or stop L, arranged to operate relatively to each other and to a driving-belt, C, as herein specified.

3. In combination with a spring, J, lever H' H², and belt C, running on the pulleys M and B, the tightener-pulley D, and its guiding-frame E G, arranged to traverse the tightening-pulley in a path close to the pulley D, as and for the purposes herein specified.

In testimony whereof I have hereunto set my hand at Indianapolis, Indiana, this 6th day of December, 1881, in the presence of two subscribing witnesses.

GUSTAVUS H. ZSCHECH.

Witnesses:
CONRAD RÜSSE,
CHARLES OFF.